United States Patent
Nakajima

(10) Patent No.: US 8,610,023 B2
(45) Date of Patent: Dec. 17, 2013

(54) METHOD AND APPARATUS FOR MANUFACTURING FOR FIXING A MOUNTING RING TO AN EXHAUST PIPE ASSEMBLY

(75) Inventor: Shoichi Nakajima, Niiza (JP)

(73) Assignee: Honda Motor Co., Ltd, Tokyo (JP)

( * ) Notice: Subject to any disclaimer, the term of this patent is extended or adjusted under 35 U.S.C. 154(b) by 401 days.

(21) Appl. No.: 12/720,939

(22) Filed: Mar. 10, 2010

(65) Prior Publication Data

US 2010/0326961 A1 Dec. 30, 2010

(30) Foreign Application Priority Data

Jun. 30, 2009 (JP) .................................. 2009-154788

(51) Int. Cl.
*B23K 1/16* (2006.01)
(52) U.S. Cl.
USPC .............................................. 219/66; 219/61
(58) Field of Classification Search
USPC ............. 219/61.1, 61.4, 66, 67, 82, 83, 117.1
See application file for complete search history.

(56) References Cited

U.S. PATENT DOCUMENTS

| | | | |
|---|---|---|---|
| 5,021,626 A * | 6/1991 | Boyd et al. ..................... | 219/109 |
| RE36,612 E * | 3/2000 | Fukushima et al. ............ | 219/83 |
| 6,281,467 B1 * | 8/2001 | Gould et al. ................... | 219/118 |
| 2004/0049906 A1 | 3/2004 | Hiramatsu et al. | |

FOREIGN PATENT DOCUMENTS

| | | |
|---|---|---|
| CH | 103023 A | 1/1924 |
| JP | 9-125260 A | 5/1997 |
| JP | 2000-097022 A | 4/2000 |
| WO | 2005/072902 A1 | 8/2005 |

OTHER PUBLICATIONS

European Search Report dated Jul. 30, 2010, issued in corresponding European Patent Application No. 10156316.1.
Japanese Office Action dated Feb. 5, 2013, issued in corresponding Japanese patent application No. 2009-154788.

\* cited by examiner

*Primary Examiner* — Kimberly Rizkallah
*Assistant Examiner* — Duy T Nguyen
(74) *Attorney, Agent, or Firm* — Westerman, Hattori, Daniels & Adrian, LLP

(57) ABSTRACT

A method and apparatus for manufacturing an exhaust pipe assembly which are capable of decreasing a temperature difference between a seam-welded outer and inner surface at the time of seam welding. The apparatus comprises an outer circumferential electrode wheel abutted on an outer circumference of a mounting ring, a pressing means pressing the outer circumferential electrode wheel to the mounting ring, an inner circumferential electrode wheel abutted on an inner circumference of a pipe making up an exhaust pipe assembly, a transformer serving as a voltage supply means for supplying a predetermined voltage to the outer and inner circumferential electrode wheels and, and a controller for controlling voltage of the transformer. Thickness T1 of the outer circumferential electrode wheel is larger than thickness T2 of the inner circumferential electrode wheel.

4 Claims, 9 Drawing Sheets

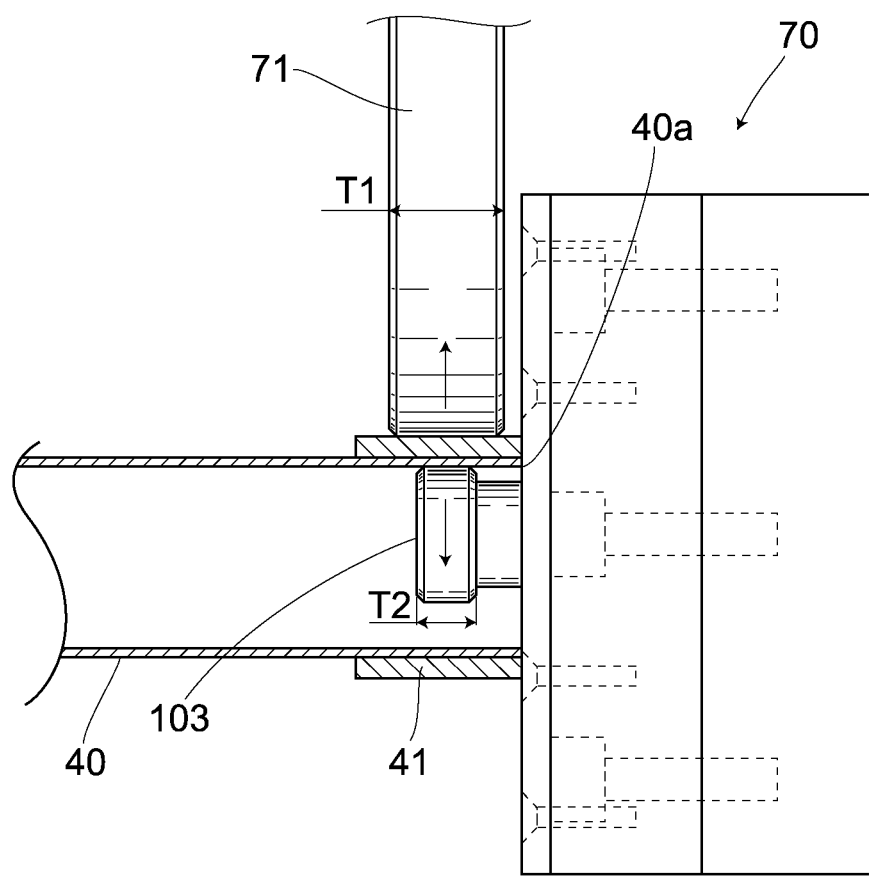

PRIOR ART

METHOD AND APPARATUS FOR MANUFACTURING FOR FIXING A MOUNTING RING TO AN EXHAUST PIPE ASSEMBLY

CROSS-REFERENCE TO RELATED APPLICATIONS

This application is based upon and claims the benefit of priority from prior Japanese Patent Application No. 2009-154788, filed on Jun. 30, 2009, the entire contents of which are incorporated herein by reference.

BACKGROUND OF THE INVENTION

1. Field of the Invention

The present invention relates to a method for manufacturing an exhaust pipe assembly and an apparatus used for the method, and more particularly, to an apparatus for fixing a mounting ring to the exhaust pipe assembly by seam welding.

2. Description of the Related Art

An exhaust pipe assembly used for a vehicle such as a two-wheeled motor vehicle, comprises a plurality of (e.g., four) exhaust pipes, which are each formed by fixing a mounting ring to a first end of a pipe and inserting a mounting flange from a second end of the pipe. Each exhaust pipe is mounted with its first end communicated with an engine, and all the exhaust pipes converge on, for example, a single pipe at their second ends to be connected with a muffler or silencer.

For example, a MIG (Metal Inert Gas) welding or TIG (Tungsten Inert Gas) welding is employed for a method of fixing the mounting ring to the first end of the pipe. However, when the mounting ring is fixed to the first end of the pipe by means of MIG welding or TIG welding, a welding bead B protrudes from an inner circumferential surface of the exhaust pipe as shown in FIG. 7, so that the welding bead B behaves as resistance against an engine exhaust emitted through the exhaust pipe assembly. Such resistance against engine exhaust causes decrease in exhaust efficiency, eventually leading to the decrease in power of engine.

To address such problem, Japanese Unexamined Patent Application Publication No. 2000-97022, for example, discloses a method for fixing a mounting ring to a first end of a pipe by seam welding. As shown in FIG. 8, a seam welding apparatus 100 according to the JP2000-97022 comprises an outer circumferential electrode wheel 101 abutted on an outer circumferential surface of a mounting ring a, a pressing means 102 for pressing the outer circumferential electrode wheel 101 to the mounting ring a, an inner circumferential electrode wheel 103 abutted on an inner circumferential surface of a pipe b making up an exhaust tube, a transformer 104 serving as a voltage supply means for supplying a predetermined voltage to the outer circumferential electrode wheel 101 and the inner circumferential electrode wheel 103, and a controller 105 controlling the voltage of the transformer 104. The outer circumferential electrode wheel 101 and the inner circumferential electrode wheel 103 are rotatably provided with a predetermined axis-to axis distance D kept therebetween.

At first, an outer circumferential portion of the first end of the pipe b is inserted into the mounting ring a, so that the pipe b with the mounting ring a is arranged in between the outer circumferential electrode wheel 101 and the inner circumferential electrode wheel 103. Then, the pressing means 102 is allowed to press the outer circumferential electrode wheel 101 toward the mounting ring a, and under that condition, the voltage supply means supplies a voltage to the outer circumferential electrode wheel 101 and the inner circumferential electrode wheel 103. At the same time, both the inner and outer circumferential electrode wheels 101 and 103 are rotated in cooperation with each other to thereby perform the seam welding along entire circumferences. In this way, the mounting ring a is fixed to the first end of the pipe b.

According to the conventional seam welding apparatus 100 in FIG. 8, the diameter of the inner circumferential electrode wheel 103 is allowed to be smaller than that of the outer circumferential electrode wheel 101 so that the mounting ring a can be fixed to the pipe b having a smaller diameter with the axis-to-axis distance D between the outer and inner circumferential electrode wheels 101 and 103 being kept constant.

However, when the welding according to the JP 2000-97022 was performed and then a welding surface after the seam welding was observed, it was found that the outer surface (seam-welded outer surface) W1 of the exhaust pipe melted more than the inner surface (seam-welded inner surface) W2 of the exhaust pipe. Thus, it is recognized that there was a difference in welding temperature between the seam-welded outer surface W1 and the seam-welded inner surface W2, as illustrated in FIGS. 9A, 9B and 9C. This temperature difference causes locations of nuggets and coronas made by the seam welding to be displaced from the boundary between the pipe and the mounting ring toward the mounting ring. Furthermore, coronas are displaced even more toward the mounting ring because the thickness of the mounting ring is large, so that there is a problem that a sufficient welding strength is not able to be obtained.

The term "nugget" used herein means a welded region that has been subjected to weld solidification in a resistance welding process. Also, the term "corona" means a ring-like region formed around a nugget by a solid-phase welding in a resistance welding process.

The above welding temperature difference is considered to be attributable to an area of contact between the mounting ring a and the outer circumferential electrode wheel 101 being smaller than that of the pipe b and the inner circumferential electrode wheel 103, as shown in FIG. 10. More specifically, an amount of the current flowing per unit area is greater between the mounting ring a and the outer circumferential electrode wheel 101 than between the pipe b and the inner circumferential electrode wheel 103, so that an amount of heat generation by resistance between the mounting ring a and the outer circumferential electrode wheel 101 is also greater between the mounting ring a and the outer circumferential electrode wheel 101, and for this reason, the seam-welded outer surface W1 is considered to have melted more seriously than the seam-welded inner surface W2.

Therefore, in order to form a corona in the boundary between the mounting ring a and the pipe b. it is imperative to boost a voltage to be supplied to the outer circumferential electrode wheel 101 and the inner circumferential electrode wheel 103, i.e., to raise a welding temperature by increasing the current. To achieve this, however, it is not desirable to use a thick mounting ring from a viewpoint of efficiency. In addition, in the case of using materials whose surfaces are easy to melt, maintenance of electrodes becomes necessary, and thus it is not desirable.

SUMMARY OF THE INVENTION

It is an object of the present invention to provide a method for manufacturing an exhaust pipe assembly for an engine, enabling the reduction of a temperature difference between a seam-welded outer surface and a seam-welded inner surface at the time of seam welding. It is another object of the present invention to provide an apparatus for manufacturing such exhaust pipe assembly.

According to a first aspect of the invention, there is provided a method for manufacturing an exhaust pipe assembly including one or more exhaust pipes, each pipe having a mounting ring fixed at a first end thereof, comprising the steps of:

abutting an outer circumferential electrode wheel on an outer circumference of said mounting ring attached to an outside of the first end of said pipe;

abutting an inner circumferential electrode wheel on an inner circumference of said pipe;

supplying a voltage to said outer circumferential electrode wheel and said inner circumferential electrode wheel, and performing a seam welding while rotating said outer circumferential electrode wheel and said inner circumferential electrode wheel to manufacture said exhaust pipe assembly, wherein said outer circumferential electrode wheel is formed thicker than said inner circumferential electrode wheel.

According to a second aspect of the invention, there is provided An apparatus for manufacturing an exhaust pipe assembly including one or more exhaust pipes, each pipe having a mounting ring fixed at a first end thereof, comprising:

an outer circumferential electrode wheel abutted on an outer circumference of said mounting ring attached to an outside of the first end of said pipe;

an inner circumferential electrode wheel abutted on an inner circumference of said pipe;

a voltage supply means for supplying a voltage to said outer circumferential electrode wheel and said inner circumferential electrode wheel, wherein a seam welding is performed while rotating said outer circumferential electrode wheel and said inner circumferential electrode wheel to manufacture said exhaust pipe assembly, and wherein said outer circumferential electrode wheel is formed thicker than said inner circumferential electrode wheel.

According to the first and second aspects of the present invention, the temperature difference between the outer circumference of the mounting ring and the inner circumference of the pipe can be reduced because the amount of current flow per unit area between the outer circumferential electrode wheel and the mounting ring can be made equal to that of current flow per unit area between the inner circumferential electrode wheel and the pipe by means of forming the thickness of the outer circumferential electrode wheel greater than that of the inner circumferential electrode wheel.

BRIEF DESCRIPTION OF THE DRAWINGS

Embodiments of the present invention will be described, by way of example only, with reference to the accompanying drawings for the purpose of illustrating the embodiments, and not for purposes of limiting the invention, wherein:

FIG. 4 is a schematic diagram illustrating an operating principle of a structure of the exhaust pipe assembly manufacturing apparatus according to the present invention.

FIG. 5 is a first photographical view of a welded portion welded by the exhaust pipe assembly manufacturing apparatus according to the present invention, in which

FIG. 6 is a second photographical view of a welded portion welded by the exhaust pipe assembly manufacturing apparatus according to the present invention, in which

FIG. 9 is a photographical view of a welded portion welded by an exhaust pipe assembly manufacturing apparatus according to a prior art, in which

DETAILED DESCRIPTION OF THE INVENTION

Figure 1:
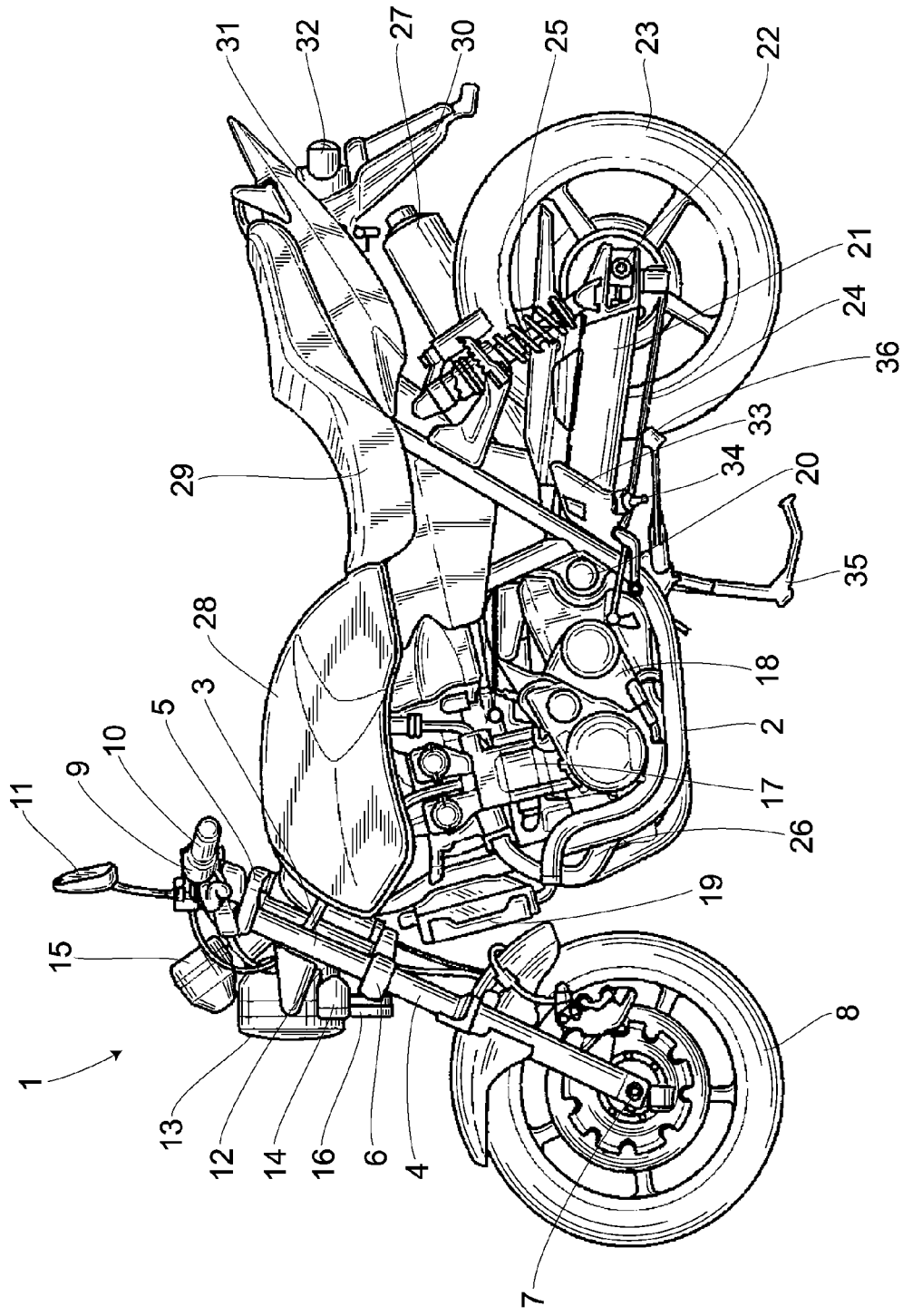
FIG. 1 is a side view of a whole two-wheeled motor vehicle including an exhaust pipe assembly manufactured by the exhaust pipe assembly manufacturing apparatus according to the present invention.

Next is a detailed description of the present invention with reference to the attached drawings.
(1) Basic Structure of a Two-wheeled Motor Vehicle At first, an explanation will be given of a structure of a two-wheeled motor vehicle including an exhaust pipe assembly according to the present invention. As shown in FIG. 1, the two-wheeled motor vehicle 1 includes a frame body 2 comprising a pair of right and left pipe frames. A steering stem, not shown in FIG. 1, is rotatably supported by a head pipe 3 connected to a front section of the frame body 2. An upper section and a lower section of the steering stem are connected to a top bridge 5 and a bottom bridge 6 of a front fork 4 respectively. The front fork 4 extends downward and supports a front wheel 8 through a front shaft 7 provided near the lower end of the front fork 4.

A handle pipe 9 is connected to the top bridge 5. A grip 10 and a mirror 11 are attached to the handle pipe 9. A bracket 12 is connected to the front fork 4. A headlight 13, a front directional light 14, and a meter 15 are attached to the bracket 12. A horn 16 is attached to the bottom bridge 6.

An engine 17 is mounted on the frame body 2, while a transmission 18 is provided below the engine 17, and a radiator 19 in front thereof, respectively. A swing arm 21 is swingably supported by a shaft 20 provided substantially in the center section of the frame body 2. A rear wheel 23 is rotatably supported by a rear wheel shaft 22 at the rear end of the swing arm 21. A drive chain 24 is hung across an output shaft (not shown) of the transmission 18 and the rear wheel shaft 22. Upper and lower ends of a rear suspension 25 are connected to the rear section of the frame body 2 and the rear end of the swing arm 21, respectively. An exhaust pipe assembly 26 extends toward the rear of the two-wheeled motor vehicle 1 with the first and second ends thereof communicated with the front section of the engine 17 and a muffler 27, respectively.

A fuel tank 28 is provided above the frame body 2, and a passenger seat 29 is provided rearwardly of the fuel tank 28. A mud guard 30, a tail/brake light 31, and a rear directional light 32 are provided on the rearmost end of the frame body 2.

A bracket 33 is joined at the rear side of the shaft 20 of the swing arm 21. A step 34 for putting a passenger's foot thereon is attached to the bracket 33 in a manner protruding outward in the width direction of the two-wheeled motor vehicle 1. A center stand 35 and a side-stand 36 are attached to the lower section of the frame body 2.

Figure 2:
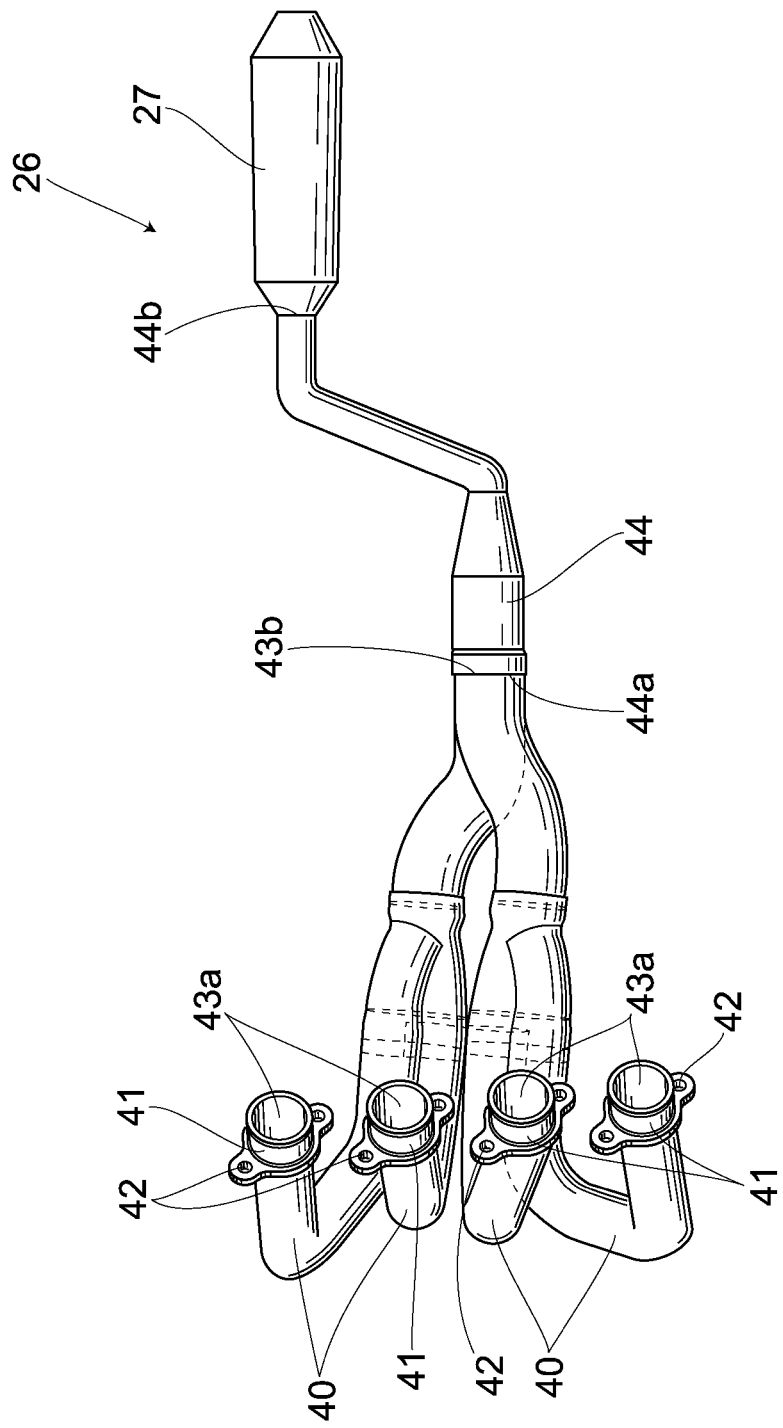
FIG. 2 is a top view of a structure of an exhaust pipe assembly manufactured by the exhaust pipe assembly manufacturing apparatus according to the present invention.

As shown in FIG. 2, the exhaust pipe assembly 26 comprises a plurality of (e.g., four) exhaust pipes 43, formed by fixing a mounting ring 41 to a first end of a pipe 40 and then moving a mounting flange 42 along the pipe 40 through a second end thereof toward the first end thereof. Each exhaust pipe 43 is fixed with a first end 43a thereof communicated with the engine 17, and a second end 43b thereof being communicated with a first end 44a of a converging section 44. A second end 44b of the converging section 44 is extended rearwardly, so as to converge on, for example, a single pipe communicated with the muffler 27.

Figure 3:
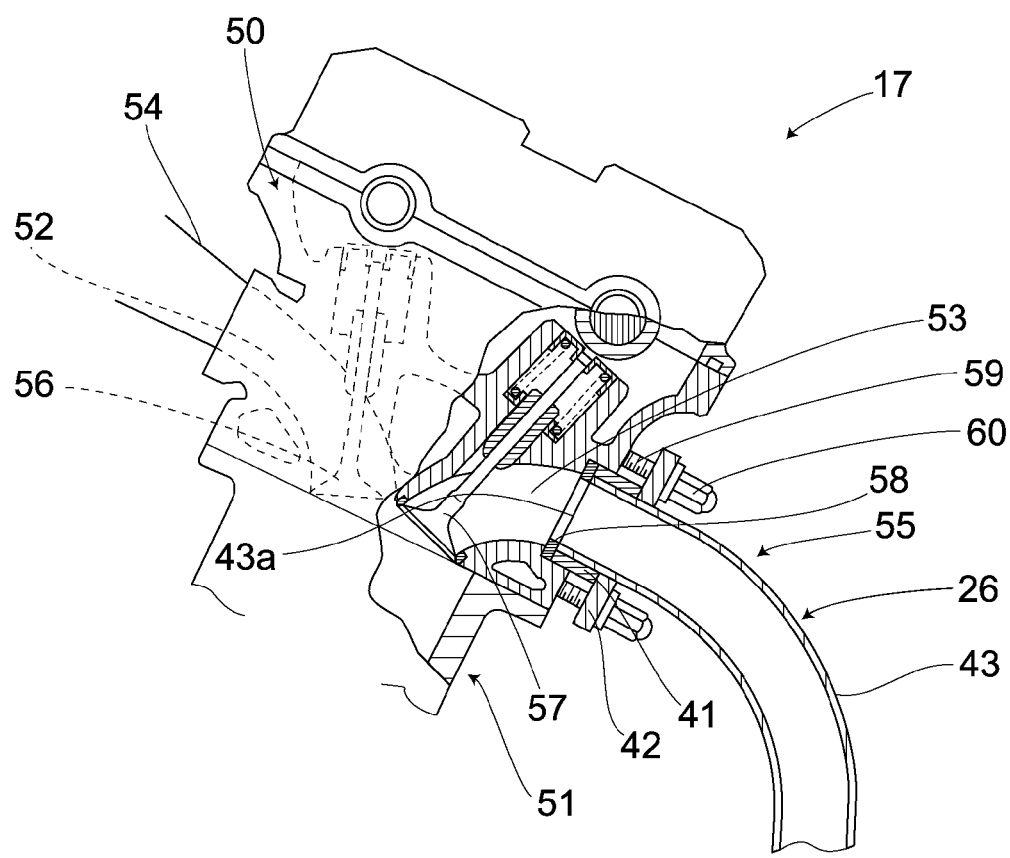
FIG. 3 is a longitudinal sectional view of a mounting structure for mounting an exhaust pipe assembly manufactured by the exhaust pipe assembly manufacturing apparatus of the present invention to an engine.

Next is a description of a mounting structure for mounting the above-structured exhaust pipe assembly 26 to the engine 17 with reference to FIG. 3. The engine 17 includes a cylinder head 50 and a cylinder 51. The cylinder head 50 is provided with an intake port 52 and an exhaust port 53. The intake port 52 and the exhaust port 53 are connected to an engine intake system 54 and an engine exhaust pipe assembly 55, respectively. The engine intake system 54 is designed so as to be able to supply a gas mixture into the cylinder 51 from the intake port 52 through an intake valve 56.

In the exhaust pipe assembly 26, the exhaust pipe 43 is connected to the exhaust port 53 so as to be able to emit an exhaust gas through an exhaust valve 57. Hereinafter is described the structure for attaching the exhaust pipe assembly 26 to the exhaust port 53. At first, a gasket 58 is fitted in the exhaust port 53. Then, the first end 43a of the exhaust pipe 43 is inserted into the exhaust port 53, and then the mounting flange 42 is set to let an embedding screw 59 provided in the cylinder head 50 therethrough. Finally, the embedding screw 59a is capped and tightened by turning a hexagon cap nut 60. By performing the same attachment work to each exhaust pipe 34, the exhaust pipe assembly 26 can be attached to the engine 17.

(2) Exhaust Pipe Assembly Manufacturing Apparatus

Figure 8:
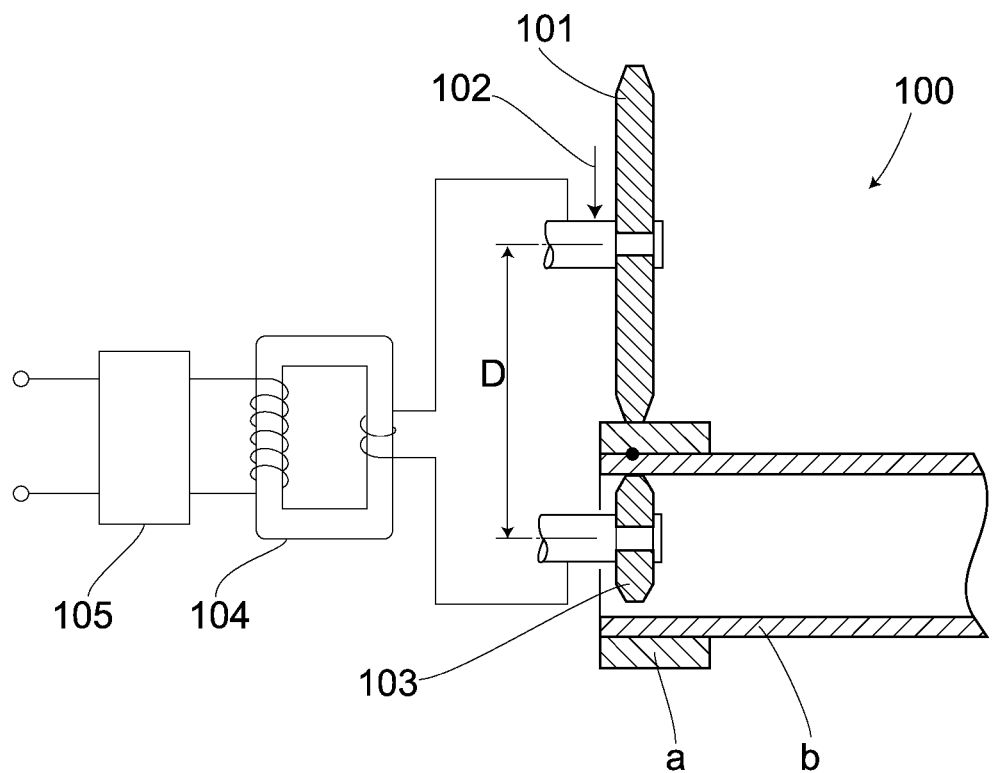
FIG. 8 is a schematic diagram illustrating an operating principle of an overall exhaust pipe assembly manufacturing apparatus according to a prior art.
Figure 9A:
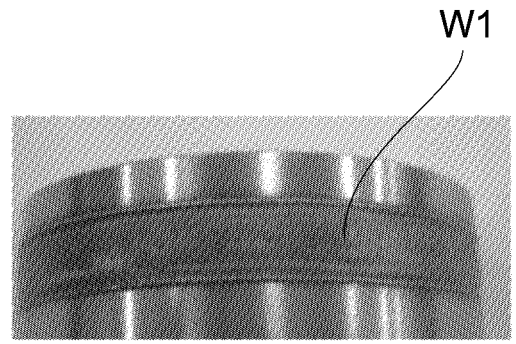
FIG. 9A is a photographical image of a seam-welded outer surface thereof.
Figure 9B:
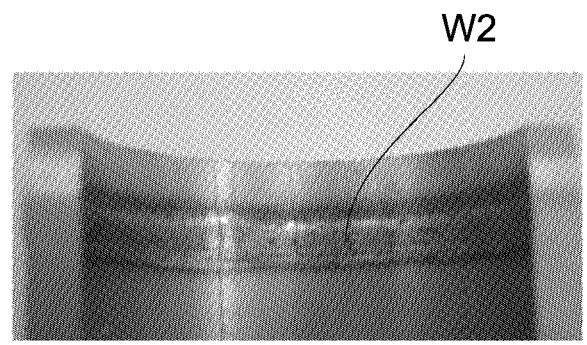
FIG. 9B is that of a seam-welded inner surface thereof.
Figure 9C:
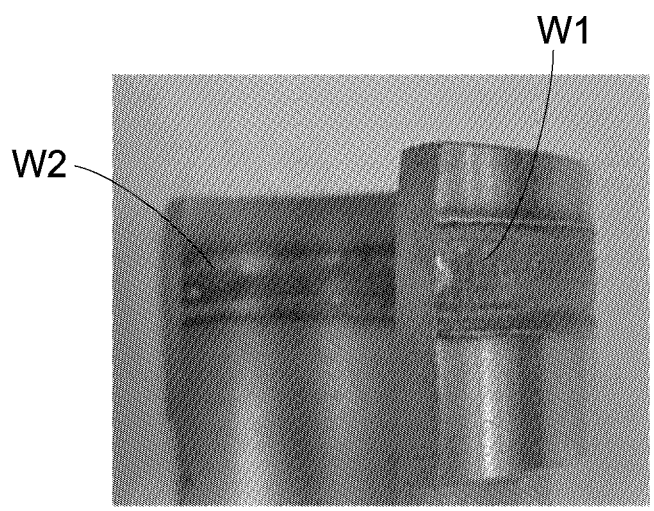
FIG. 9C is that of a longitudinal section thereof.
Figure 10:
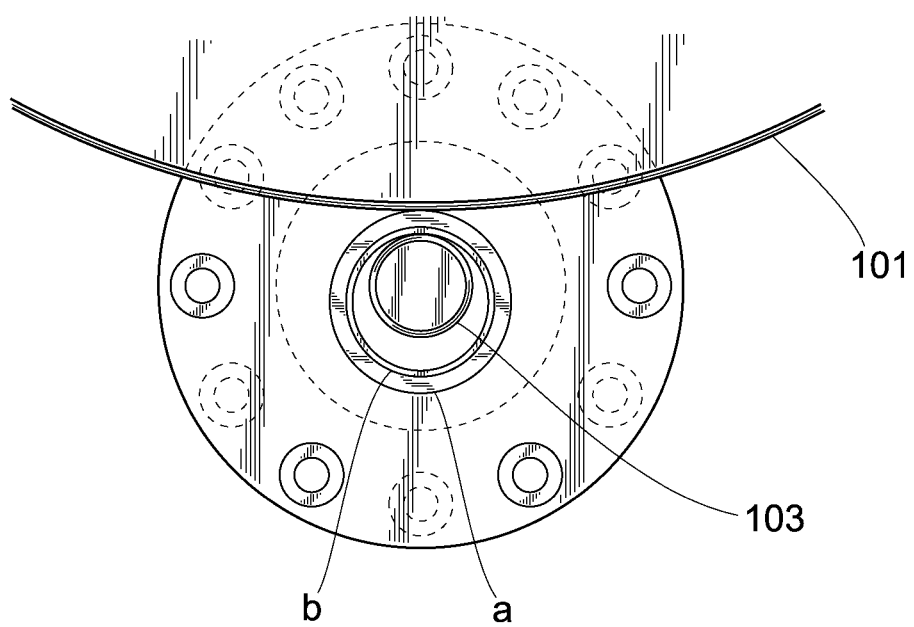
FIG. 10 is a schematic view showing a positional relationship among an outer circumferential electrode wheel, an inner circumferential electrode wheel, a mounting ring, and a pipe in the exhaust pipe assembly manufacturing apparatus.

Next, an exhaust pipe assembly manufacturing apparatus 70 according to the present embodiment is explained with reference to FIG. 4. As the exhaust pipe assembly manufacturing apparatus 70 shown in FIG. 4 only differs in structure of an outer circumferential electrode wheel from a hereinafter-described seam welding apparatus 100 shown in FIG. 8, the same structures as those that of the seam welding apparatus 100 are designated by the same numerals, and their repeated descriptions are omitted for simplicity.

The exhaust pipe assembly manufacturing apparatus 70 comprises an outer circumferential electrode wheel 71 abutted on an outer circumference of the mounting ring 41, a pressing means 102 (not shown in this drawing) pressing the outer circumferential electrode wheel 71 to the mounting ring 41, an inner circumferential electrode wheel 103 abutted on an inner circumference of the pipe 40 making up the exhaust pipe assembly 26, a transformer 104 (not shown in this drawing) as a voltage supply means for supplying a predetermined voltage to the outer circumferential electrode wheel 71 and the inner circumferential electrode wheel 103, and a controller 105 (not shown in this drawing) controlling the voltage of the transformer 104.

The outer circumferential electrode wheel 71 is structured such that an area of contact between the outer circumferential electrode wheel 71 and the mounting ring 41 can substantially be equal to that between the inner circumferential electrode wheel 103 and the pipe 40. According to the present embodiment, thickness T1 of the outer circumferential electrode wheel 71 is greater than thickness T2 of the inner circumferential electrode wheel 103. The thickness T1 of the outer circumferential electrode wheel 71 may be determined, balancing with the thickness T2 of the inner circumferential electrode wheel 103. For example, under hereinafter-described conditions, the thickness T1 can be in a range of from about 1.1 to 2.0 times greater than the thickness T2. If the thickness T1 gets more than twice the thickness T2, then it is not preferable as there is a possibility that the inner surface of the pipe 40 may be overheated in that case.

As follows is a description of a procedure for manufacturing the exhaust pipe 43, using the foregoing exhaust pipe assembly manufacturing apparatus 70. Initially, the mounting ring 41 is attached to the outside of the first end 40a of the pipe 40 by passing the end 40a therethrough. Then, the mounting ring 41 is abutted upon the outer circumferential electrode wheel 71 while the inner circumferential surface of the pipe 40 is abutted upon the inner circumferential electrode wheel 103, thereby setting the mounting ring 41 and the pipe 40 with respect to the exhaust pipe assembly manufacturing apparatus 70.

Then, the outer and inner circumferential electrode wheels 71 and 103 are driven, which, in this case, are set so as to rotate in the direction of an arrow in the drawing at the same circumferential velocity. In this manner, the mounting ring 41 is seam-welded to the first end of the pipe 40, and the mounting flange 42 is attached to the first end thereof by letting the pipe 40 therethrough from the second end thereof, thus obtaining the exhaust pipe 43 as shown in FIG. 2.

Figure 5A:
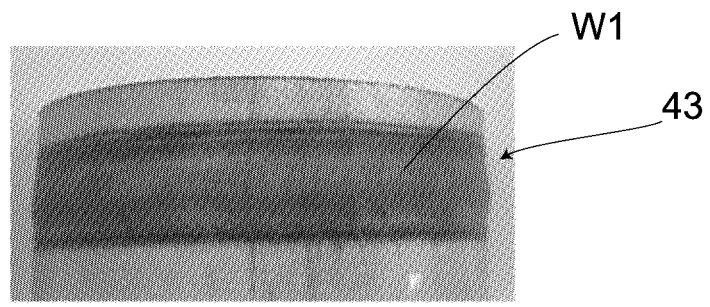
FIG. 5A is a photographical image of a seam-welded outer surface thereof.
Figure 5B:
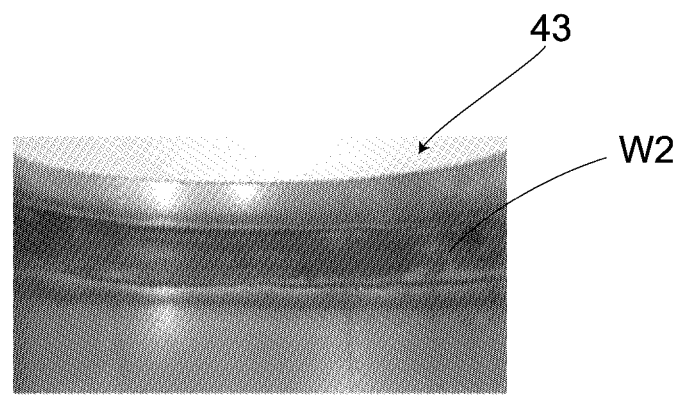
FIG. 5B is that of a seam-welded inner surface thereof.
Figure 5C:
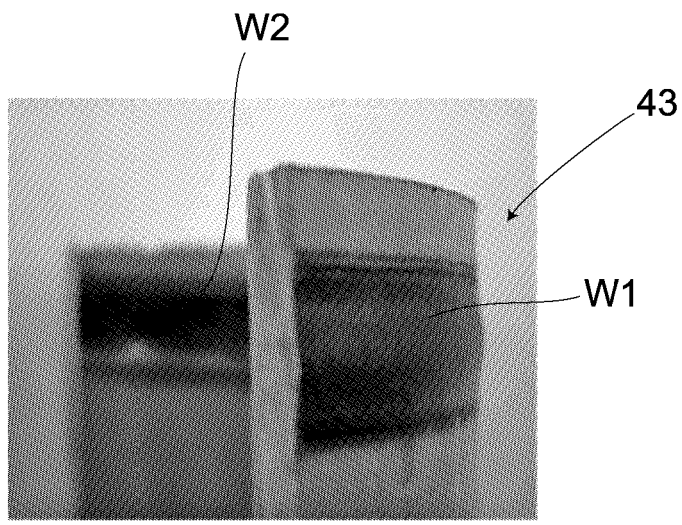
FIG. 5C is that of a longitudinal section thereof.

FIGS. 5A, 5B, and 5C are photographic overview images of the first end of the exhaust pipe 43 manufactured by the above-structured exhaust pipe assembly manufacturing apparatus 70. In the exhaust pipe assembly manufacturing apparatus 70, the outer circumferential electrode wheel 71 was 300 mm in diameter and 12 mm in thickness, and the inner circumferential electrode wheel 103 was 30 mm in diameter and 8 mm in thickness. The pipe 40 was 38.1 mm in outer diameter and 1.0 mm in thickness, and the mounting ring 41 was 44 mm in outer diameter and 3.0 mm in thickness. Further, welding was performed under the conditions of 8000 A current, 350 mm/min circumferential velocity, and 350 $kg/cm^2$ welding pressure, respectively.

As is clearly seen from the drawing, it could be confirmed that both of the seam-welded outer surface W1 and the seam-welded inner surface W2 of the manufactured exhaust pipe were heated substantially to the same degree. This fact demonstrates that the exhaust pipe assembly manufacturing apparatus 70 of the present invention can reduce the temperature difference between the seam-welded outer surface W1 and the seam-welded inner surface W2.

According to the exhaust pipe assembly manufacturing apparatus 70 of the present invention, the thickness T1 of the outer circumferential electrode wheel 71 is formed greater than the thickness T2 of the inner circumferential electrode wheel 103 so that the area of contact between the outer circumferential electrode wheel 71 and the mounting ring 41 can substantially be equal to that between the inner circumferential electrode wheel 103 and the pipe 40. As a result, the amount of current flow per unit area between the mounting ring 41 and the outer circumferential electrode wheel 71 can be made equal to that of current flow per unit area between the pipe 40 and the inner circumferential electrode wheel 103. Therefore, the exhaust pipe assembly manufacturing apparatus 70 can reduce the temperature difference between the seam-welded outer surface W1 and the seam-welded inner surface W2.

Figure 6A:
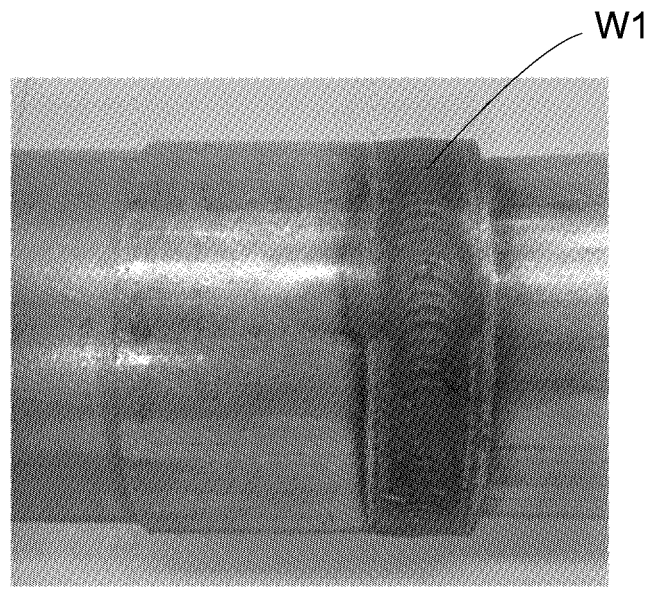
FIG. 6A is a photographical image of a seam-welded outer surface thereof.
Figure 6B:
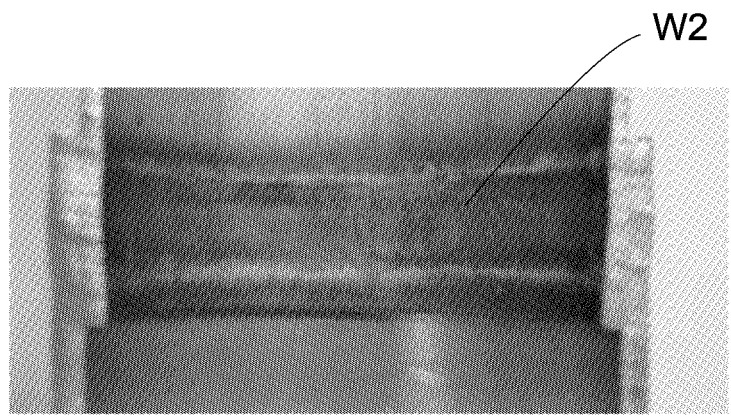
FIG. 6B is that of a longitudinal section thereof.
Figure 7:
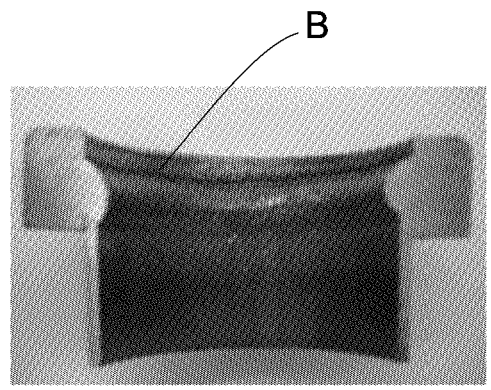
FIG. 7 is a photographic view of a longitudinal section of an exhaust pipe welded by MIG welding.

FIGS. 6A and 6B are photographic overview images of a seam-welded portion where another ring was attached to the outside of the mounting ring 41 so that three members were seam-welded by the exhaust pipe assembly manufacturing apparatus 70. As is clearly seen from the drawings, it could be confirmed that both of the seam-welded outer surface W1 and the seam-welded inner surface W2 were heated to the substantially same degree by means of the seam welding using the exhaust pipe assembly manufacturing apparatus 70, even though the portion to be welded becomes thick.

As described above, according to the exhaust pipe assembly manufacturing apparatus 70 of the invention, it is possible to adjust the position of a nugget so as to be located near the boundary between the pipe 40 and the mounting ring 41 when seam-welding the pipe 40 to the mounting 41 each having a different thickness. This allows the nugget to be prevented from protruding outside at the time of seam-welding, enabling the suppressing of surface flash, thus increasing quality of the exhaust pipe assembly 26.

Further, it is possible to decrease the voltage applied to the outer circumferential electrode wheel 71 and the inner circumferential electrode wheel 103, and thus the pipe 40 and the mounting ring 41 can be welded with their surface temperature kept lower than by the conventional arts. Therefore, the exhaust pipe assembly manufacturing apparatus 70 can increase the quality of the appearance of the exhaust pipe assembly 26.

Furthermore, according to the exhaust pipe assembly manufacturing apparatus 70 of the invention, it is possible to perform welding between the outer circumferential electrode wheel 71 and the inner circumferential electrode wheel 103 in a well-balanced manner, and hence, it is possible to reduce a voltage to be applied as well as a welding pressure applied by the pressing means 102 to press the outer circumferential electrode wheel 71 toward the mounting ring 41. In this way, the exhaust pipe assembly manufacturing apparatus 70 can prevent the wear of the outer circumferential electrode wheel 71 and the inner circumferential electrode wheel 103 in comparison with the conventional apparatus, and also can allow the dressing to be performed less frequently, thus allowing the service life thereof to be prolonged, eventually enabling reduction of production cost. In the meantime, the term "dressing" used herein means applying a shaping process to the surface or end of an electrode, which is an electrode that directly contacts a base material to allow a welding current therethrough and also to transfer a welding pressure.

The present invention is not limited to the foregoing embodiment, and can be modified within the scope of the invention. Although manufacture of the exhaust pipe assembly 26 comprising the four exhaust pipes connected to the single muffler 27 is described in the foregoing embodiment, the present invention should not be limited thereto, but may be applied to various types of the exhaust pipe assembly 26 in which the number of the exhaust pipes 43 and the muffler(s) 27 is changed arbitrarily.

Furthermore, although the exhaust pipe assembly 26 of the engine 17 mounted to the two-wheeled motor vehicle 1 is described in the above embodiment, the present invention should not be limited thereto, but may also be applied to an exhaust pipe assembly of an engine of a three-wheeled motor vehicle.

What is claimed is:

1. A method for manufacturing an exhaust pipe assembly including one or more exhaust pipes, each exhaust pipe having a mounting ring fixed at a first end thereof, comprising the steps of:

abutting an outer circumferential electrode wheel on an outer circumference of said mounting ring attached to an outside of the first end of said exhaust pipe;

abutting an inner circumferential electrode wheel on an inner circumference of said exhaust pipe;

supplying a voltage to said outer circumferential electrode wheel and said inner circumferential electrode wheel; and performing a seam welding while rotating said outer circumferential electrode wheel and said inner circumferential electrode wheel to manufacture said exhaust pipe assembly, wherein a thickness of a center radial portion of said outer circumferential electrode wheel is greater than a thickness of a center radial portion of said inner circumferential electrode wheel, in order to make, in a top-view, a contact area between the outer circumferential electrode wheel and the mounting ring substantially equal to a contact area between the inner circumferential electrode wheel and the exhaust pipe.

2. The method for manufacturing an exhaust pipe assembly according to claim 1, wherein the thickness of the center radial portion of said outer circumferential electrode wheel is substantially in a range of from 1.1 to 2.0 times greater than the thickness of said inner circumferential electrode wheel.

3. An apparatus for manufacturing an exhaust pipe assembly including one or more exhaust pipes, each exhaust pipe having a mounting ring fixed at a first end thereof, said apparatus comprising:

an outer circumferential electrode wheel configured to directly contact an outer circumference of said mounting ring attached to an outside of the first end of said exhaust pipe;

an inner circumferential electrode wheel configured to directly contact an inner circumference of said exhaust pipe; and a voltage supply means for supplying a voltage to said outer circumferential electrode wheel and said inner circumferential electrode wheel, wherein a seam welding is performed while rotating said outer circumferential electrode wheel and said inner circumferential electrode wheel to manufacture said exhaust pipe assembly, and wherein a thickness of a center radial portion of said outer circumferential electrode wheel is greater than a thickness of a center radial portion of said inner circumferential electrode wheel of said apparatus, thus making, in top view, a contact area between the outer circumferential electrode wheel and the mounting ring substantially equal to a contact area between the inner circumferential electrode wheel and the exhaust pipe.

4. The apparatus for manufacturing an exhaust pipe assembly according to claim 3, wherein the thickness of the center radial portion of said outer circumferential electrode wheel is substantially in a range of from 1.1 to 2.0 times greater than the thickness of said inner circumferential electrode wheel.

* * * * *